United States Patent [19]

Hashimoto

[11] Patent Number: 4,885,645
[45] Date of Patent: Dec. 5, 1989

[54] WRITE COMPENSATOR FOR MAGNETIC DISK APPARATUS

[75] Inventor: Yasuichi Hashimoto, Oome, Japan

[73] Assignee: Kabushiki Kaisha Toshiba, Kawasaki, Japan

[21] Appl. No.: 84,145

[22] Filed: Aug. 12, 1987

[30] Foreign Application Priority Data

Aug. 20, 1986 [JP] Japan .................................. 61-194589

[51] Int. Cl.⁴ .............................................. G11B 5/09
[52] U.S. Cl. ........................................ 360/45; 360/46
[58] Field of Search ............................. 360/45, 46, 51

[56] References Cited

U.S. PATENT DOCUMENTS

| | | | |
|---|---|---|---|
| 3,510,786 | 5/1970 | Paulson | 328/155 |
| 3,879,342 | 4/1975 | Patel | 360/45 |
| 4,000,513 | 12/1976 | Precourt | 360/45 |
| 4,205,352 | 5/1980 | Tomada | 360/45 |
| 4,334,250 | 6/1982 | Theus | 360/45 |
| 4,516,178 | 5/1985 | Lee . | |
| 4,604,660 | 8/1986 | Horie et al. | 360/45 |
| 4,607,295 | 8/1986 | Uno | 360/45 |
| 4,672,482 | 6/1987 | Troletti | 360/45 |
| 4,724,369 | 2/1988 | Hashimoto . | |

FOREIGN PATENT DOCUMENTS 0109248 11/1983 European Pat. Off. .
3338877 5/1984 Fed. Rep. of Germany .

OTHER PUBLICATIONS

European Search Report.

*Primary Examiner*—Vincent P. Canney
*Attorney, Agent, or Firm*—Finnegan, Henderson, Farabow, Garrett and Dunner

[57] ABSTRACT

A write compensator for a magnetic disk apparatus includes a flip-flop for latching write compensation information using not a recording data format conversion reference clock but converted recording data. The flip-flop latches the write compensation information until the next recording data is input. The recording data is write-compensated on the basis of the latched write compensation information.

3 Claims, 6 Drawing Sheets

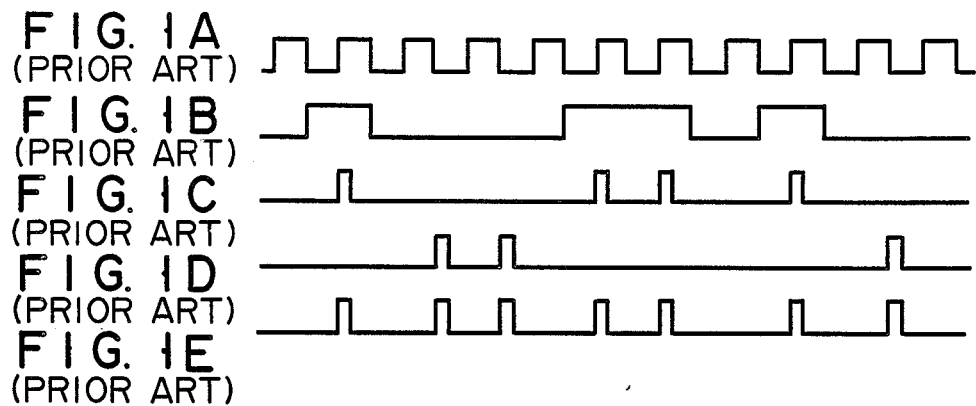
FIG. 1A (PRIOR ART)
FIG. 1B (PRIOR ART)
FIG. 1C (PRIOR ART)
FIG. 1D (PRIOR ART)
FIG. 1E (PRIOR ART)
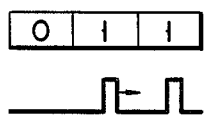
FIG. 2A (PRIOR ART)
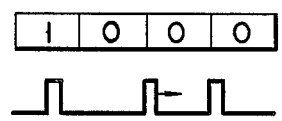
FIG. 2B (PRIOR ART)
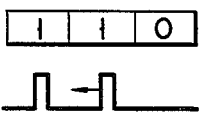
FIG. 2C (PRIOR ART)
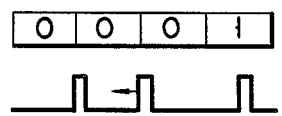
FIG. 2D (PRIOR ART)

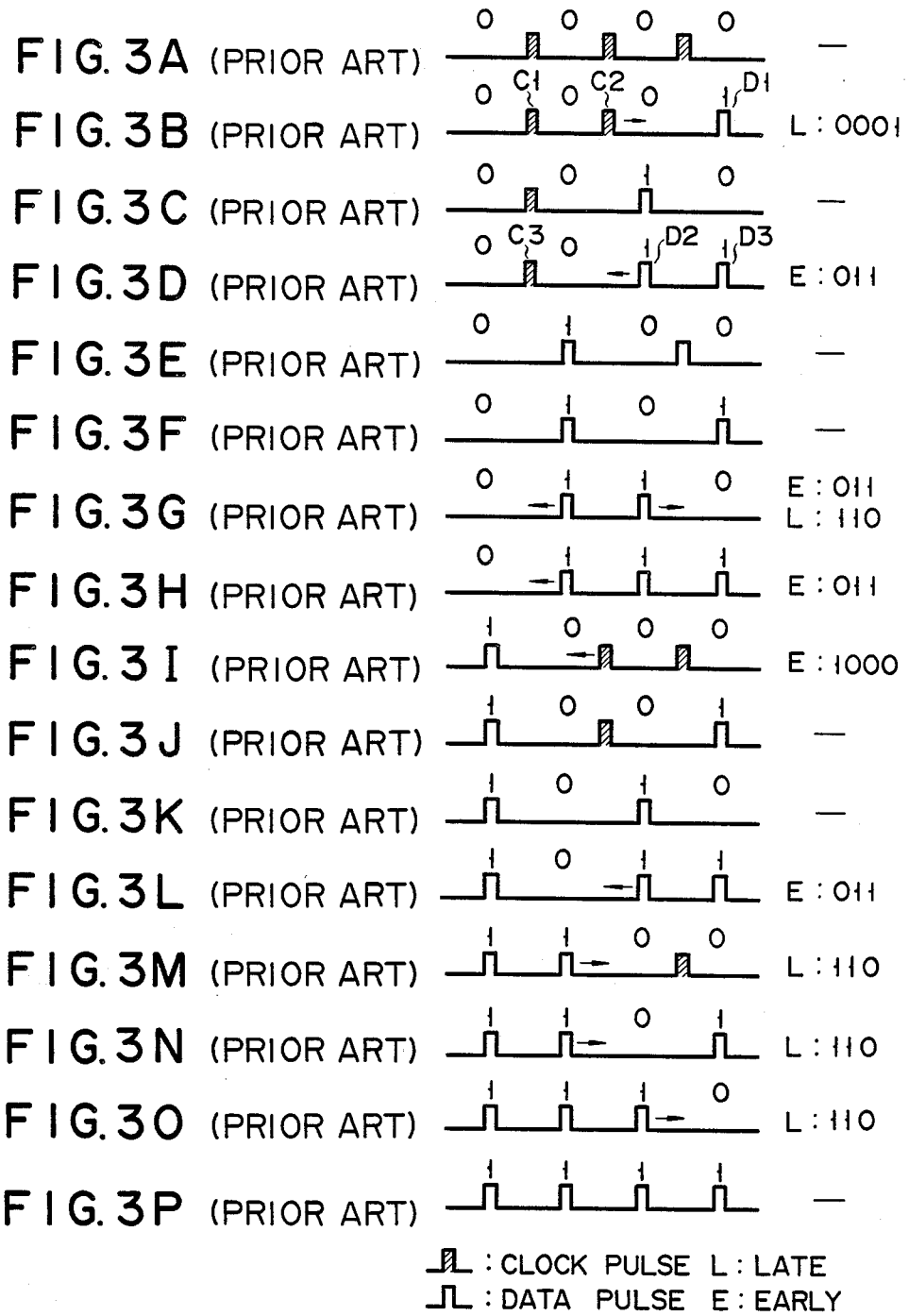

| PEAK SHIFT LATE | PEAK SHIFT EARLY |
|---|---|
| 0001 | 011 |
| 110 | 1000 |

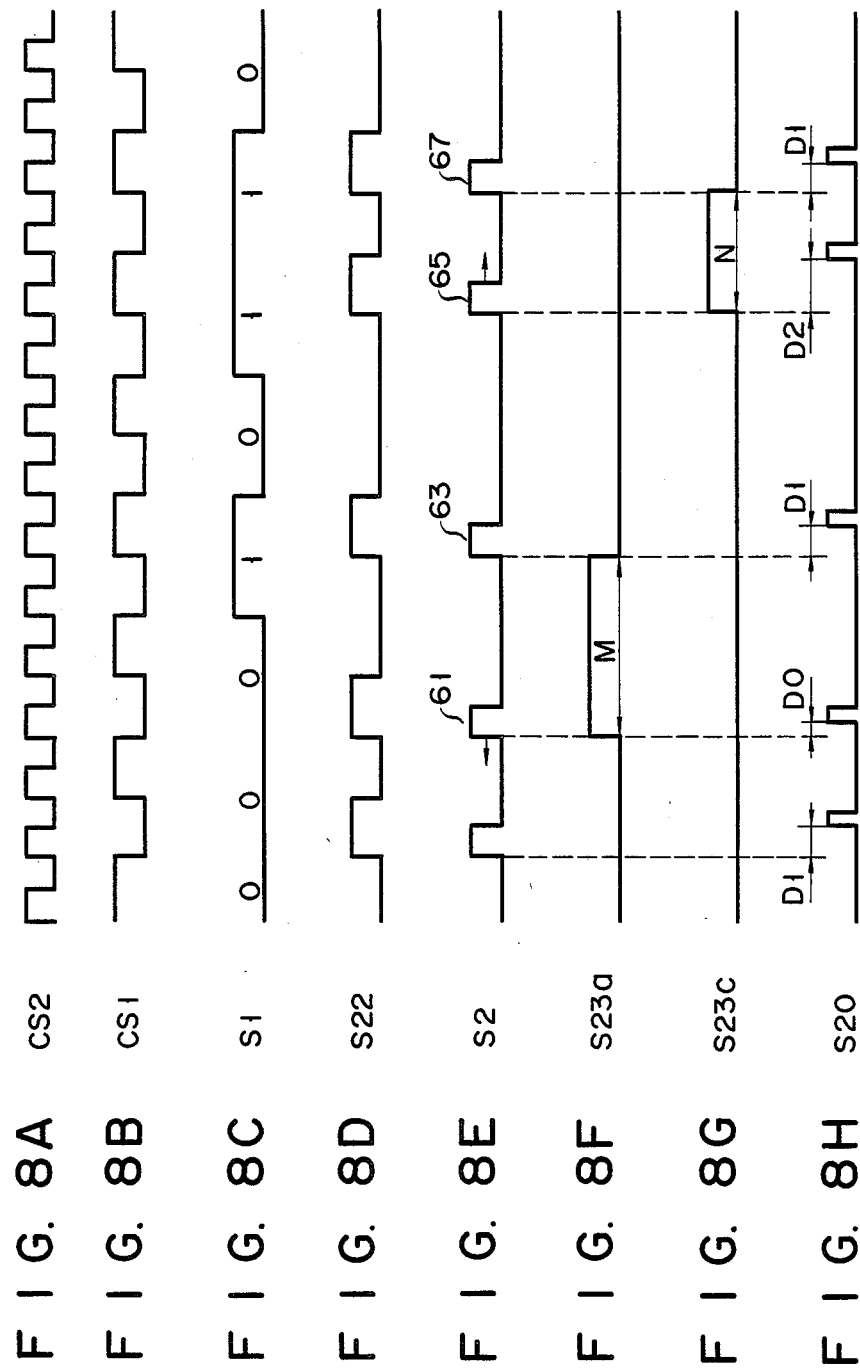

WRITE COMPENSATOR FOR MAGNETIC DISK APPARATUS

BACKGROUND OF THE INVENTION

The present invention relates to a write compensator for a magnetic recording/reproducing apparatus for performing high-density recording.

In a magnetic disk apparatus for performing high-density recording, a peak shift occurs in a data pulse due to the influence of adjacent bits when data is read out from a disk. This decreases time margins for data and clock windows When the margins are excessively decreased, an error rate is increased.

FIGS. 1A through 1E show a case wherein recording data externally transferred in the nonreturn-to-zero (NRZ) format for high-density recording is converted into recording data in the modified frequency modulation (MFM) format, and the converted data is written in a recording medium. FIG. 1A shows a data transfer reference clock, and FIG. 1B shows NRZ recording data. The NRZ recording data shown in FIG. 1B is transferred in synchronism with the reference clock shown in FIG. 1A. The NRZ recording data is converted into MFM recording data shown in FIG. 1E in accordance with MFM conversion rules in the magnetic disk apparatus in response to clock and data pulses shown in FIGS. 1C and 1D. The converted data is written in the magnetic recording medium. In this case, peak shifts occur in the data patterns shown in FIGS. 2A through 2D.

As shown in FIGS. 3A through 3P, peak shift directions are changed in accordance with different data pulse trains, as indicated by arrows. For example, referring to FIG. 3B, clock pulse C2 repulses clock and data pulses C1 and D1. In this case, clock pulse C2 is closer to clock pulse C1 than to data pulse D1. Therefore, clock pulse C2 repulses clock pulse C1 and is shifted in a direction of the arrow. Referring to FIG. 3D, data pulse D2 is closer to data pulse D3 than to clock pulse C3. Therefore, data pulse D2 repulses data pulse D3 and is shifted in a direction of the arrow.

Peak shifts can be predicted in the data write mode in accordance with data pulse patterns. Data patterns subjected to peak shifts are summarized as follows. When data pulse patterns are "0001" and "110" as shown in FIG. 4, late peak shifts occur. However, if data pulse patterns are "011" and "1000", early peak shifts occur, as shown in FIG. 4. Therefore, when recording data have patterns "011" and "1000", respectively, the data are shifted in directions of the arrows (right direction) in FIGS. 2A and 2B, i.e., in directions opposite to the read direction. However, when recording data have patterns "110" and "0001", repectively, data are shifted in directions of the arrows (left direction) in FIGS. 2C and 2D, thereby achieving write compensation.

Write compensation is conventionally performed by a write compensator shown in FIG. 5. Shift register 11 stores externally transferred NRZ recording data S1 in synchronism with reference clock signal CS1 and outputs it to decoder 13.

Decoder 13 has a function for converting NRZ recording data S1 into MFM recording data S2 and a function for producing write compensation information by decoding a pattern of data S2. More specifically, NRZ recording data S1 is converted into MFM recording data S2 in response to reference clock signals CS1 and CS2. The pattern of data S2 is decoded to generate signal S13a for compensation in an "early direction (i.e., a direction in which a write timing advances), noncompensation signal 13b, or signal 13c for compensation in a "late" direction (i.e., a direction in which a write timing is delayed). Signal 13a, 13b, or 13c is output to NAND gate 15.

Delay circuit 17 delays reference clock signal CS2 by delay times D0, D1, and D2 to obtain signals S17a, S17b, and S17c. Signals S17a, S17b, and S17c are input to NAND gate 15. logically NANDed by NAND gate 15 with signals S17a, S17b, and S17c from delay circuit 17. Output signals S15a, S15b, and S15c from NAND gate 15 are input to NAND gate 19. Signals S15a, S15b, and S15c are logically NANDed by NAND gate 19, and NAND gate 19 outputs writecompensated MFM recording data S19.

The operation of the write compensator having the arrangement described above will be described with reference to timing charts of FIGS. 6A through 6G. Externally transferred NRZ recording data S1 (FIG. 6C) is input to shift register 11 at the trailing edge of reference clock signal CS1 (FIG. 6B). In this case, shift register 11 comprises a 4-bit shift register. Recording data S1 is shifted in response to every clock CS1.

When recording data S1 is stored in shift register 11, data S1 is output to decoder 13. Decoder 13 decodes recording data S1 (FIG. 6C) from register 11 in response to reference clock signals CS1 and CS2 and generates MFM recording data S2 (FIG. 6D). Two reference clock signals CS1 and CS2 are used to assure accurate synchronization timings. In this case, a sync signal required in write compensation is signal CS1, and signal CS1 must be a signal having an accurate waveform. For this reason, signal CS2 having a frequency twice that of signal CS1 is produced and is frequency-divided to generate signal CS1 having an accurate waveform.

Decoder 13 decodes the pattern of converted recording data S2 to determine necessity of write compensation and generates write compensation information as needed. Compensation information signal S13a (FIG. 6E) for compensating recording data S2 in the early direction, noncompensation information signal S13b and compensation information signal S13c (FIG. 6F) for compensating data S2 in the late direction are output from decoder 13 to NAND gate 15. Since the pattern of recording data S1 is "0001", as shown in FIG. 6C, pulse 35 in recording data S2 is delayed, as shown in FIG. 6D. Signal S13a for compensating the write timing in the early direction is output between trailing edges 31a and 31b of reference clock signal CS1. As shown in FIG. 6D, pulse 37 in recording data S2 is advanced. Therefore, signal S13c for compensating the write timing in the late direction is output between trailing edges 33a and 33b of reference clock signal CS1. Noncompensation information signal S3b (not shown) is output for pulses not subjected to compensation between the current and next trailing edges of reference clock signal CS1.

At the same time, delayed signals S17a, S17b, and S17c obtained by delaying reference clock signal CS2 by delay times D0, D1, and D2 are output from delay circuit 17 to NAND gate 15.

Signals S13a, S13b, and S13c from decoder 13 and signals S17a, S17b, and S17c from delay circuit 17 are logically NANDed by NAND gate 15, and output signals S15a, S15b, and S15c therefrom are output to NAND gate 19. Signals S15a, S15b, and S15c from NAND gate 15 are logically NANDed by NAND gate 19. Write-compensated MFM recording data S19 is output from NAND gate 19.

FIG. 6G shows write-compensated MFM recording data. No shift occurs in MFM recording data 41 in FIG. 6D. Delay time D1 is assigned to pulse 41 as indicated by pulse 43 in FIG. 6G. However, since pulse 35 in FIG. 6D is shifted in the late direction, delay time D0, which is shorter than delay time D1, is given to pulse 35 to compensate for the time (D1−D0) in the early direction (direction indicated by arrow 51), as indicated by pulse 45 in FIG. 6G. Pulse 37 is shifted in the early direction, as shown in FIG. 6D. Therefore, delay time D2, which is longer than delay time D1, is given to pulse 37 to compensate for the time (D2−D1) in the late direction (direction indicated by arrow 53), as indicated by pulse 47 in FIG. 6G.

In the conventional magnetic disk apparatus for performing high-density recording, the above write compensator is used to automatically shift write timings in a direction to reduce peak shifts In the write compensator shown in FIG. 5, however, write compensation information is derived using a reference clock signal as a reference. Therefore, the delay time length of the write compensation information signal is determined by the duration of the reference clock signal. Time length J of signal S13a for compensating write timings in the early direction and time length K of signal S13c for compensating the write timings in the late direction, as shown in FIG. 6E, must fall within the length of time between the current and next trailing edges of reference clock signal CS1 due to the following reason. Recording data S1 is shifted and shift register 11 outputs different values to decoder 13 whenever reference signal CS1 is input to shift register 11. Decoder 13 must completely decode the input before the output signal from register 11 is updated. Therefore, each delay time length of signals S13a, S13b, and S13c cannot exceed one cycle of reference signal CS1. Therefore, ranges of delay times D0, D1, and D2 (i.e., delay times D0, D1, and D2 of signals S17a, S17b, and S17c) of write-compensated recording data S19 are solely determined.

When the circuit is designed in practice, operating times of shift register 11 and decoder 13 must be taken into consideration, and the lengths of delay times D0, D1 and D2 are further shortened. Therefore, delay times D0, D1, and D2 cannot be flexible The absence of flexibility poses a problem when the recording density is increased.

SUMMARY OF THE INVENTION

It is an object of the present invention to provide a write compensator for a magnetic disk apparatus, wherein flexibility of delay times for write compensation can be assured by increasing the delay time lengths of write information signals.

In order to achieve the above object of the present invention, there are provided data converting means for converting input recording data into a predetermined recording data format, write compensation information generating means for generating write compensation information on the basis of a conversion pattern of the input recording data or a data pattern of the recording data converted by said data converting means, write compensation information storing means for storing the write compensation information from said write compensation information generating means on the basis of the recording data converted by said data converting means, and write-compensating means for performing write compensation of the converted recording data on the basis of the write compensation information stored in said write compensation information storing means.

BRIEF DESCRIPTION OF THE DRAWINGS

FIGS. 1A through 1E are timing charts for explaining the MFM conversion scheme, in which FIG. 1A shows a data transfer reference clock, FIG. 1B shows NRZ recording data, FIG. 1C shows a clock pulse, FIG. 1D shows a data pulse, and FIG. 1E shows MFM-converted recording data;

FIGS. 2A through 2D are views for explaining peak shifts, in which FIGS. 2A and 2B show peak shifts in the early direction, and FIGS. 2C and 2D show peak shifts in the late direction;

FIGS. 3A through 3P are charts showing peak shift directions of data patterns;

FIGS. 6A through 6G are timing charts for explaining the operation of the write compensator shown in FIG. 5, in which FIGS. 6A and 6B show reference clock signals CS2 and CS1, FIG. 6C shows NRZ recording data, FIG. 6D shows MFM-converted recording data S2, FIGS. 6E and 6F show signals S13a and S13c for compensating the write timings in the early and late directions, respectively, and FIG. 6G shows write-compensated MFM-converted recording data S19;

FIGS. 8A through 8H are timing charts for explaining the operation of the write compensator shown in FIG. 7, in which FIGS. 8A and 8B show reference signals CS2 and CS1, FIG. 8C shows NRZ recording data S1, FIG. 8D shows signal S22 representing generation of MFM recording data S2 and generated by decoder 21, FIG. 8E shows MFM recording data S2, FIG. 8F shows signal S23a for compensating the write timing in the early direction, FIG. 8G shows signal S23c for compensating the write timing in the late direction, and FIG. 8H shows write-compensated MFM recording data S20.

DETAILED DESCRIPTION OF THE PREFERRED EMBODIMENT

Figures 4, 5:
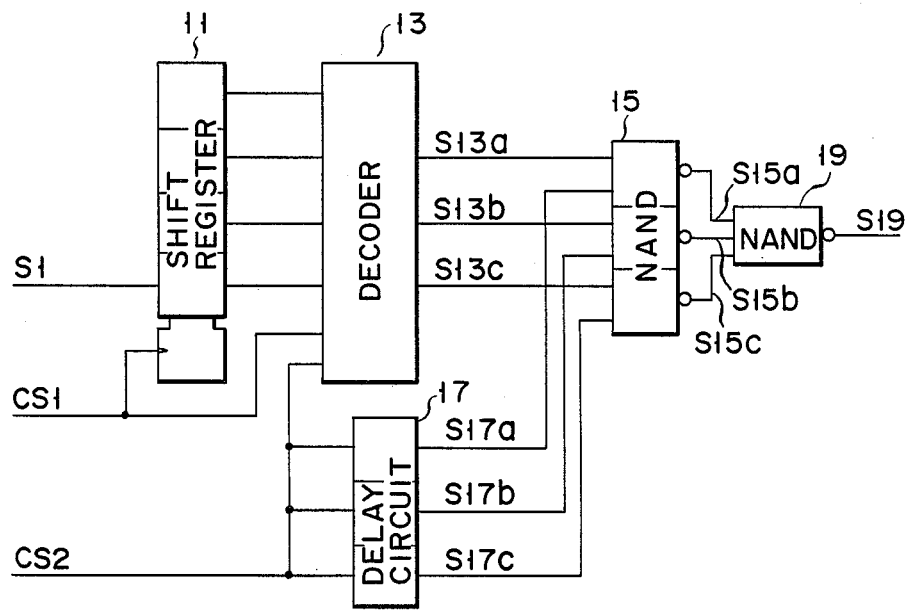
FIG. 4 is a table showing data patterns subjected to peak shifts.
FIG. 5 is a block diagram of a conventional write compensator.
Figure 6:
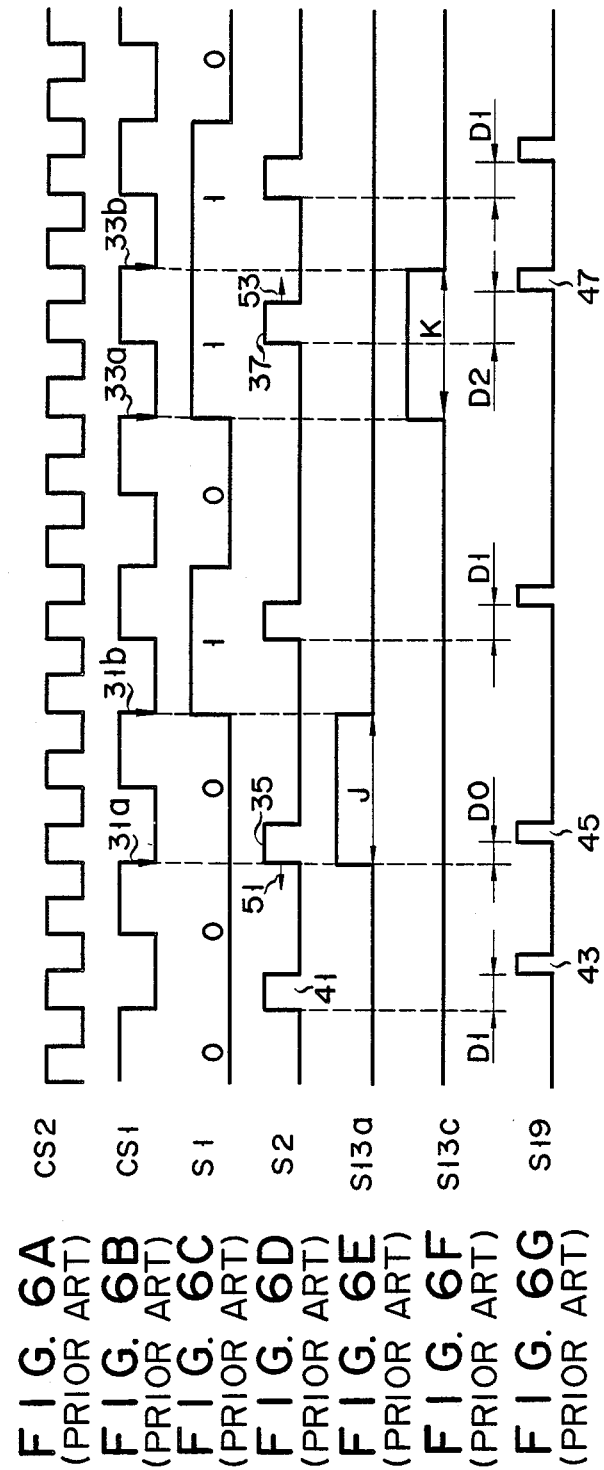
Figure 7:
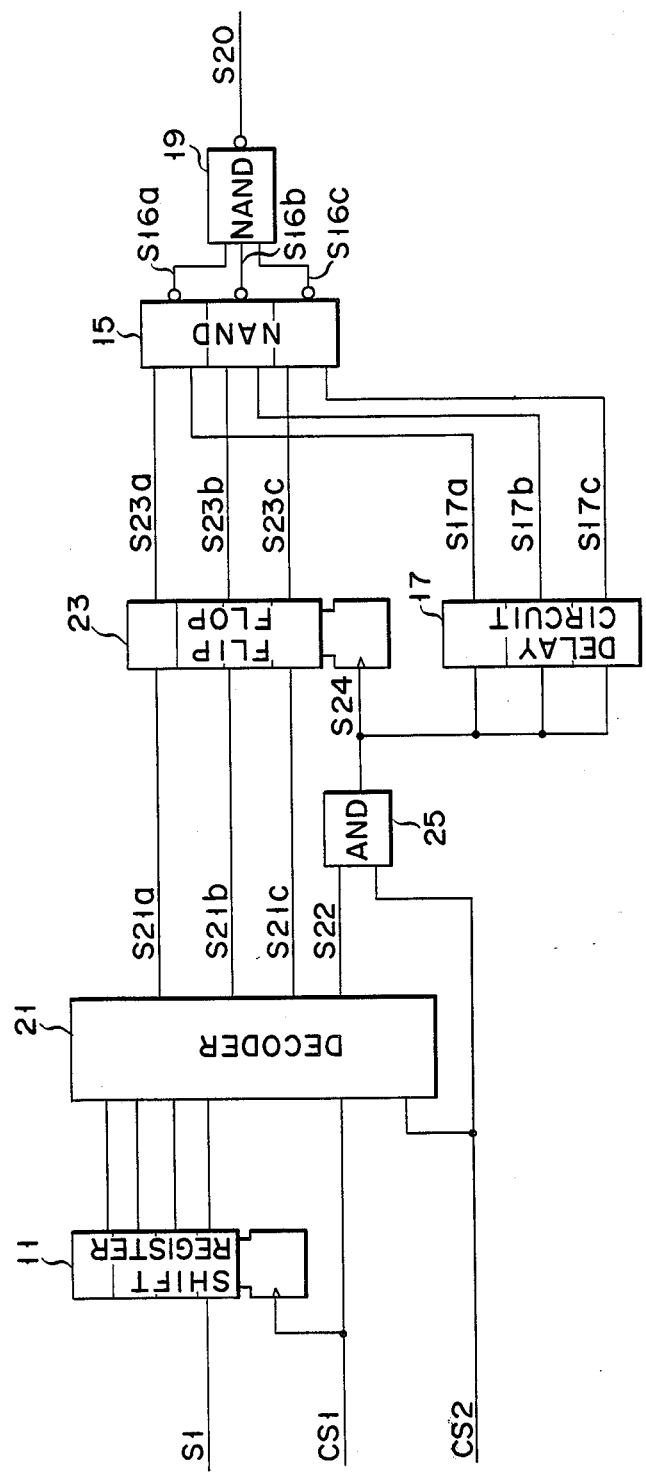
FIG. 7 is a block diagram of a write compensator for a magnetic disk apparatus according to an embodiment of the present invention.

FIG. 7 is a block diagram of a write compensator for a magnetic disk apparatus according to an embodiment of the present invention. The same reference numerals as in FIG. 5 denote the same parts in FIG. 7, and a detailed description thereof will be omitted. In response to reference clock signals CS1 and CS2, decoder 21 decodes NRZ recording data S1 stored in shift register 11. The decoded output serves as MFM recording data S2. Decoder 21 decodes the data pattern of data S2 to determine necessity of compensation and generates write compensation information signals S21a, S21b, and S21c as needed. More specifically, write compensation information signal S21a for compensating recording data S2 in the early direction, write compensation information signal S21b for noncompensation, and write compensation information signal S21c for compensating recording data S2 in the late direction are output to flip-flop 23.

Decoder 21 has a function for supplying signal S22 representing generation of MFM recording data S2 to AND gate 25. Signal S22 (FIG. 8D) output from decoder 23 is a signal representing that recording data S2 shown in FIG. 8E is present. More specifically, signal S22 rises in response to the leading edge of recording data S2 shown in FIG. 8E and falls in response to the leading edge of reference signal CS1 shown in FIG. 8B. Signal S22 is supplied to AND gate 25. AND gate 25 supplies trigger signal S24 to flip-flop 23 in response to reference signal CS2 shown in FIG. 8A. Flip-flop 23 retains the contents until trigger signal S24 is supplied from AND gate 25. Signal S22 may be a logical OR signal of signals S21a, S21b, and S21c.

Flip-flop 23 comprises a D-type flip-flop. When trigger signal S24 is supplied from AND gate 25 to flip-flop 23, write compensation information signals S21a, S21b, and S21c which have been retained in flip-flop 23 are output to NAND gate 15 as write compensation information signals S23a, S23b, and S23c. At the same time, new write compensation information signals S21a, S21b, and S21c are received by flip-flop 23. Delay circuit 17 receives trigger signal S24 from AND gate 25 and delays it by delay times D0, D1, and D2 to produce delayed signals S17a, S17b and S17c. Signals S17a, S17b and S17c are output to NAND gate 15.

Write compensation information signals S23a, S23b, and S23c from flip-flop 23 and delayed signals S17a, S17b, and S17c from delay circuit 17 are logically NANDed by NAND gate 15. Signals S16a, S16b, and S16c are supplied from NAND gate 15 to NAND gate 19 and are logically NANDed by NAND gate 19. NAND gate 19 outputs write-compensated MFM recording data S20.

NAND gates 15 and 19 constitute an OR gate and write-compensated recording data S20 is output in accordance with one of signals S21a, S21b, and S21c.

The operation of the write compensator having the above arrangement will be described with reference to timing charts of FIGS. 8A through 8H. Externally transferred NRZ recording data S1 is input to shift register 11 at the trailing edge of reference clock signal CS1. Shift register 11 stores 4-bit recording data S1 in response to the reference clock signal.

When recording data S1 is stored in shift register 11, as described above, data S1 is output to decoder 21. Decoder 21 decodes recording data S1 from shift register 11 in response to reference clock signals CS1 and CS2 and outputs MFM recording data S2 shown in FIG. 8E.

Decoder 21 decodes a pattern of converted recording data S2 to determine necessity of compensation and generates write compensation information as needed. Write compensation information signals S21a, S21b, and S21c are output to flip-flop 23. Pulse 61 of recording data S2 shown in FIG. 8E is delayed. In this case, signal S23a (FIG. 8F) for compensating data S2 in the early direction is output between the leading edge of pulse 61 and the leading edge of the next pulse 63. Pulse 65 in recording data S2 is advanced. Signal S23c (FIG. 8G) for compensating data S2 in the late direction is output between the leading edge of pulse 65 and the leading edge of pulse 67. Signal S23b (not shown) is output for pulses not subjected to compensation between the leading edge of such a pulse and the leading edge of the next pulse.

Decoder 21 outputs signal S22 to AND gate 25. Signal S22 represents that recording data S2 has been generated. AND gate 25 receives reference clock signal CS2. Reference clock signal CS2 and signal S22 from decoder 21 are logically ANDed by AND gate 25. Output signal S24 from AND gate 25 is output to flip-flop 23 and delay circuit 17.

Write compensation information signals S21a, S21b, and S21c from decoder 21 are stored in flip-flop 23 in response to signal S24 as a trigger signal.

Flip-flop 23 retains write compensation information signals S21a, S21b, and S21c until trigger signal S24 is output from AND gate 25. Trigger signal S24 is output to flip-flop 23 whenever signal S22 shown in FIG. 8D is output, i.e., recording data S2 shown in FIG. 8E is output. Therefore, when recording data S2 is not output, signals S21a, S21b, and S21c are retained regardless of the clock period of signal CS1 of FIG. 8B. As a result, the pulse widths of write compensation signals S23a and S23c can be increased, as shown in FIGS. 8F and 8G, respectively. The pulse width can be increased to a maximum width until the next recording data S2 is input. It should be noted that write compensation information signal S23b for noncompensation is not illustrated but its pulse width can also be increased in the same manner as in signals S23a and S23c.

Flip-flop 23 outputs write compensation information signals S21a, S21b, and S21c as write compensation information signals S23a, S23b, and S23c to NAND gate 15.

Delayed signals S17a, S17b, and S17c from delay circuit 17 are input to and are logically ANDed by NAND gate 15. Signals S16a, S16b, and S16c are output from NAND gate 15 to NAND gate 19. Signals S16a, S16b, and S16c are logically NANDed by NAND gate 19, thereby outputting write-compensated MFM recording data S20.

In the write compensator according to the present invention, the write compensation information signals from decoder 21 are temporarily stored in flip-flop 23 by using converted recording data. Write compensation is performed on the basis of the write compensation information signals output from the flip-flop 23. Delay time length M of signal S23a for compensating the write timing in the early direction and delay time length N of signal S23c for compensating the write timing in the late direction can be given with reference to the pulse width of recording data S2.

Delay time D0, D1, and D2 of write-compensated recording data S20 can be prolonged, thus providing flexibility in delay times.

In the above embodiment, write compensation information is obtained on the basis of the pattern of the converted recording data. However, write compensation information may be obtained on the basis of the pattern of recording data prior to conversion.

What is claimed is:

1. A write compensator comprising:
   data converting means for converting input recording data into a predetermined recording data format;
   write compensation information generating means for generating write compensation information on the basis of a conversion pattern of the input recording data or a data pattern of the recording data converted by said data converting means, said write compensation information generating means outputting a write recording data presence signal representing that recording data to be written is present;

write compensation information storing means for storing the write compensation information from said write compensation information generating means in response to said write recording data presence signal and holding current write compensation information until the next write recording data signal is supplied; and write-compensating means for performing write compensation of the converted recording data on the basis of the write compensation information stored in said write compensation information storing means.

2. A compensator according to claim 1, wherein said write compensation information storing means comprises a flip-flop.

3. A compensator according to claim 1, further comprising:

a delay circuit for receiving the write recording data presence signal output from said write compensation information generating means and generating a first delayed signal for compensating recording data writing in an early direction, a second delayed signal for performing no write compensation of the recording data, and a third delayed signal for compensating recording data writing in a late direction; and a gate circuit for receiving the write compensation information from said delay circuit and said write compensation information storing means and outputting a write compensated signal as the recording data when a time corresponding to a supplied one of the delayed signal has elapsed.

* * * * *